(12) United States Patent
Domeniconi

(10) Patent No.: US 12,024,382 B2
(45) Date of Patent: Jul. 2, 2024

(54) HANDLING BAR FOR LAMINATED OR FILM SUPPORTS

(71) Applicant: GTK TIMEK GROUP, S.A., Rivera-Monteceneri (CH)

(72) Inventor: Lorenzo Domeniconi, Rivera-Monteceneri (CH)

(73) Assignee: GTK TIMEK GROUP, S.A., Rivera-Monteceneri (CH)

( * ) Notice: Subject to any disclaimer, the term of this patent is extended or adjusted under 35 U.S.C. 154(b) by 325 days.

(21) Appl. No.: 17/435,688

(22) PCT Filed: Mar. 10, 2020

(86) PCT No.: PCT/IB2020/052046
§ 371 (c)(1),
(2) Date: Sep. 1, 2021

(87) PCT Pub. No.: WO2020/183354
PCT Pub. Date: Sep. 17, 2020

(65) Prior Publication Data
US 2022/0169467 A1    Jun. 2, 2022

(30) Foreign Application Priority Data
Mar. 12, 2019   (IT) .................. 102019000003553

(51) Int. Cl.
*B65H 20/14* (2006.01)
*B01D 46/24* (2006.01)

(52) U.S. Cl.
CPC ......... *B65H 20/14* (2013.01); *B01D 46/2403* (2013.01); *B01D 2275/30* (2013.01); *B01D 2279/00* (2013.01); *B65H 2601/521* (2013.01)

(58) Field of Classification Search
None
See application file for complete search history.

(56) References Cited

U.S. PATENT DOCUMENTS

| | | | | |
|---|---|---|---|---|
| 3,567,093 A | * | 3/1971 | Johnson | B65H 23/24 242/615.12 |
| 4,197,972 A | * | 4/1980 | Daane | B65G 51/03 242/615.12 |
| 4,416,201 A | * | 11/1983 | Kessler | B41K 3/60 101/367 |

(Continued)

FOREIGN PATENT DOCUMENTS

| | | |
|---|---|---|
| DE | 102005048217 A1 | 4/2007 |
| DE | 102005048217 B4 * 12/2007 | B65H 23/00 |

(Continued)

*Primary Examiner* — Joseph A Dillon, Jr.

(57) ABSTRACT

A handling bar for laminated or film supports, such as paper, is disclosed, including a hollow tubular body provided with an inner cavity and an outer side surface, a plurality of through holes, arranged on the tubular body to put the inner cavity in contact with the outer side surface. The handling bar also includes at least one connection to a compressed air source or a suction device, where the connection is shaped for the inflow of compressed air or to suction air into the cavity and at least one filtering element arranged inside the tubular body where at least at one portion of the holes filters the air passing between the inner cavity and the holes.

20 Claims, 4 Drawing Sheets

(56) References Cited

U.S. PATENT DOCUMENTS

| | | | | |
|---|---|---|---|---|
| 5,797,531 | A * | 8/1998 | Marmin | B65H 23/32 |
| | | | | 226/97.4 |
| 6,024,266 | A | 2/2000 | Helinski et al. | |
| 6,722,608 | B1 * | 4/2004 | Gavit | B65H 23/24 |
| 7,383,772 | B2 * | 6/2008 | Boppel | B65H 45/28 |
| | | | | 226/97.1 |
| 7,654,427 | B1 * | 2/2010 | Tsai | B65H 20/12 |
| | | | | 242/615.11 |
| 9,938,614 | B2 * | 4/2018 | Young | C23C 18/163 |
| 10,294,057 | B2 * | 5/2019 | Devitt | B65H 20/14 |
| 11,739,020 | B2 * | 8/2023 | Bisson | B65G 51/03 |
| | | | | 406/88 |
| 2012/0213599 | A1 * | 8/2012 | Inazawa | B65H 23/32 |
| | | | | 156/60 |
| 2015/0239700 | A1 * | 8/2015 | Cornell | B65H 20/14 |
| | | | | 242/615.12 |
| 2021/0197526 | A1 * | 7/2021 | Yang | B32B 37/226 |
| 2022/0332626 | A1 * | 10/2022 | Fournel | C03B 17/062 |

FOREIGN PATENT DOCUMENTS

| | | | | |
|---|---|---|---|---|
| DE | 102008008772 | A1 | 9/2009 | |
| DE | 102009007565 | A1 * | 8/2010 | B65H 23/24 |
| DE | 102009007565 | A1 | 8/2010 | |

* cited by examiner

HANDLING BAR FOR LAMINATED OR FILM SUPPORTS

PRIORITY CLAIM

This application claims priority to International Appln. No. PCT/IB2020/052046, filed on Mar. 10, 2020, which claims priority to Italian Appln. No. 102019000003553, filed on Mar. 12, 2019, which this application incorporates by reference.

TECHNICAL FIELD

The present invention concerns the handling field, especially the field of the handling of supports, typically in the film or laminated form, such as paper, textile, leather, plastic or metal film supports.

RELATED ART

As known, rotary bars, which can be idle or driven, are provided in different technical sectors for handling the supports or films inside machines, for example printing machines.

It is known to provide handling bars, in particular for paper supports, able to generate a thin air chamber between the handling bar and the support so that to allow less friction and consequently less resistance to the rolling or feed between the support and the handling bar.

Generally, for this purpose, the handling bars are provided at their outer surface with a series of through holes communicating with the hollow inside of the bar, the latter is connected, through appropriate connections and ducts, to a compressed air source such as a compressor, which injects air inside the bar; by coming out of the appropriate holes, the latter creates an air cushion between the support and the handling bar which favors the sliding of the support on the bar.

The Applicant observed that this type of handling bar is characterized by significant noise and a very high consumption of air.

U.S. Pat. No. 6,024,266 and DE102005048217 describe the generic state of the art.

Hollow handling bars made of sintered metal material were also provided in an attempt to solve the aforesaid issues.

The Applicant has however observed that the hollow handling bars made of sintered metal material perform optimally in reducing the noise and consumption of air, but that they have very high costs which allow their use only for a limited number of applications and for handling bars of small sizes.

The Applicant has thus encountered the need to provide a new type of handling bar for laminated or film supports which can reduce the consumption of compressed air and the noise of the known handling bars, without simultaneously having the costs of the handling bars made of sintered metal material.

SUMMARY

Therefore, in its first aspect, the invention concerns a handling bar for laminated or film supports, such as paper, leather, textile, plastic or metal material supports, comprising:
- a hollow tubular body provided with an inner cavity and an outer side surface;
- a plurality of through holes, arranged on said tubular body so that to put said inner cavity in fluidic communication with said outer side surface;
- at least one connection to a compressed air source or a suction device; said connection being shaped for the inflow of compressed air or to suction air into said inner cavity;

characterized by comprising:
- at least one filtering element arranged inside said tubular body at least at one portion of said plurality of holes so that to filter the air passing between the inner cavity and the plurality of holes; said filtering element being arranged so that to abut against the portion of the through hole facing the inner cavity.

For the purpose of the present description, "axial direction," "axially" mean a direction substantially coincident with or parallel to the prevalent extension direction of the handling bar.

"Circumferential direction" or "circumferentially" means a direction along a circle arranged around the handling bar or around its central axis arranged in the axial direction, said circle substantially lying in a plane orthogonal to a central axis arranged in the axial direction of the handling bar itself.

In the aforesaid aspect, the present invention can have at least one of the preferred characteristics described hereunder.

Advantageously, the filtering element is arranged at the entire plurality of through holes.

Preferably, the filtering element has a tubular shape.

Conveniently, the filtering element has a band-like shape.

Advantageously, the tubular body comprises at least one housing seat of at least one filtering assembly.

Conveniently, at least one filtering assembly can be removably fastened in at least one housing seat, by means of reversible fastening means.

Preferably, each filtering assembly comprises:
- at least one upper element comprising through holes;
- at least one filtering element;
- at least one pusher element configured to push said at least one filtering element against the through holes.

Preferably, the pusher element comprises an opening for the inflow of compressed air or for suctioning air from inside the filtering assembly.

Conveniently, the handling bar comprises a duct, at least partially arranged inside said inner cavity, for fluidically connecting each filtering assembly with a connection to a compressed air source or a suction device.

Advantageously, the handling bar comprises two supporting hubs, each arranged at the opposite axial ends of the tubular body.

Further characteristics and advantages of the invention will become clearer in the detailed description of some preferred, but not exclusive, embodiments of a handling bar for laminated or film supports.

BRIEF DESCRIPTION OF THE DRAWINGS

Such description will be set forth hereunder with reference to the accompanying drawings, only provided by way of example and thus not limiting.

DETAILED DESCRIPTION

Figure 1:
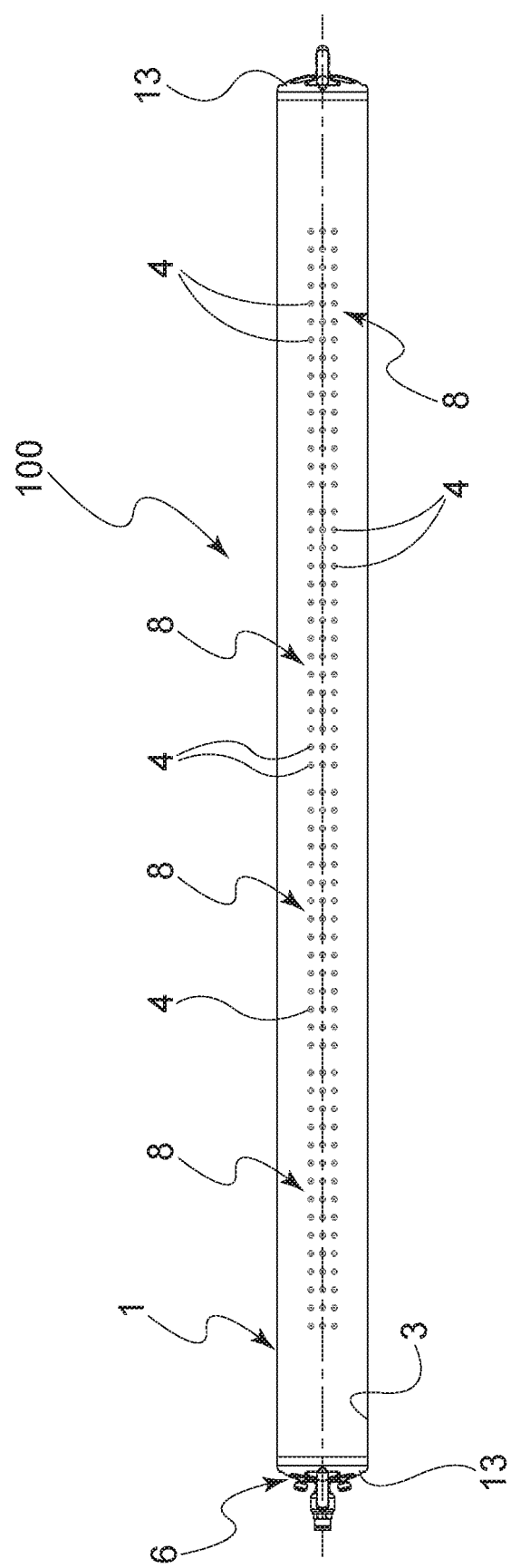
FIG. 1 shows a schematic top view of a handling bar for supports according to the present invention.

With reference to the figures, a handling bar for laminated or film supports, such as paper, leather, textile, plastic or metal material supports, according to the present invention is depicted with the numeral reference 100.

The handling bar 100 for laminated or film supports has a hollow tubular body 1 provided with an inner cavity 2 and an outer side surface 3.

The handling bar 100 has a supporting hub 13 at each axial end.

At least one connection 6 to a compressed air source or a suctioning device is provided at one of the two supporting hubs 13. The connection 6 is shaped for the inflow of compressed air or for receiving air inside the inner cavity 2.

A plurality of through holes 4, arranged so that to put the inner cavity 2 in fluidic communication with the outer side surface 3, is provided on the outer side surface 3 of the hollow tubular body 1.

With reference to the embodiment shown in the figures, the through holes 4 are arranged in groups 8, each group 8 comprising several rows 21 of holes spaced out in a circumferential direction.

The rows 21 of through holes are spaced in a circumferential direction by a distance C measured between the centers of two circumferentially consecutive holes 4, which is between 5 and 30 mm, preferably between 7 and 20 mm.

In the same row 21, the through holes 4 can be spaced in the axial direction by a distance M measured between the centers of two axially consecutive holes, which is between 5 and 60 mm, preferably between 7 and 20 mm.

Each row 21 extends in the axial direction so that the set of rows 21 in the axial direction of all groups 8 has an axial extent size 1 equal to at least 10% of the overall axial extent L of the tubular body 1.

Figure 2:
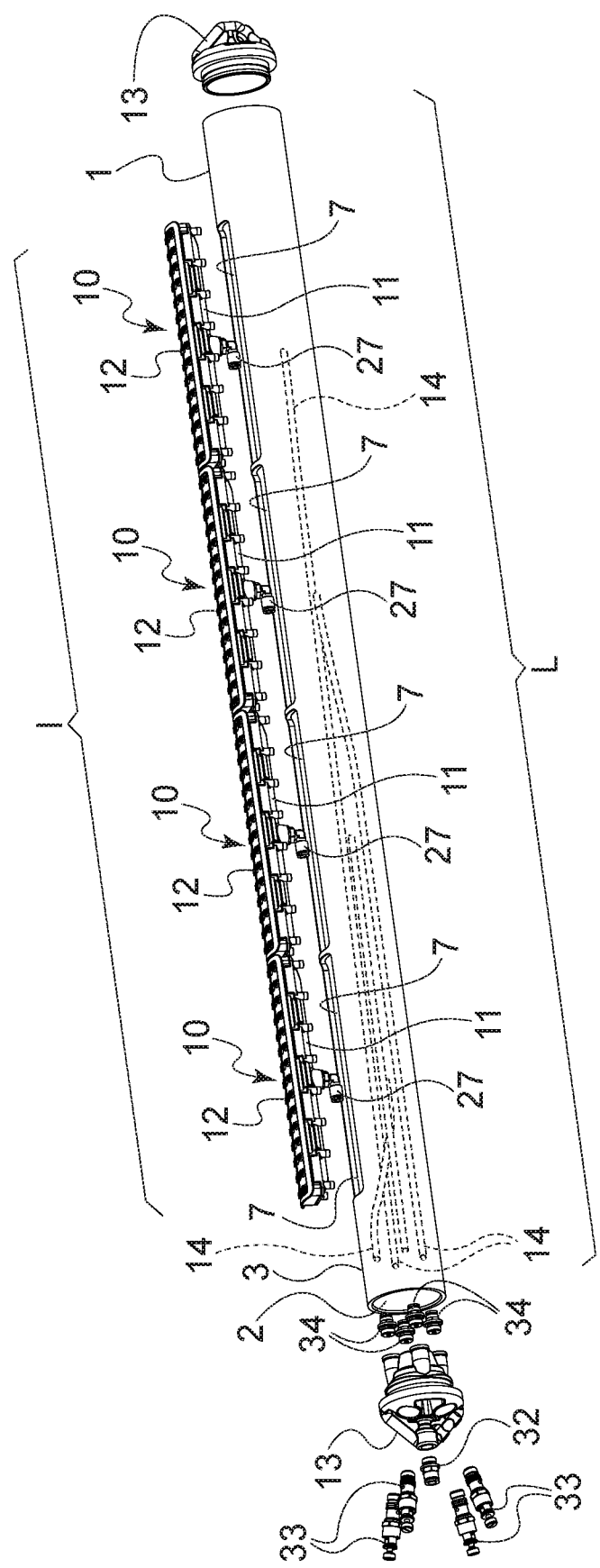
FIG. 2 shows a partially exploded schematic perspective view of the handling bar of FIG. 1.

The overall axial size L of the tubular body 1 is measured, with reference to FIG. 2, from an axial end of the tubular body 1 to the remaining axial end, excluding the two supporting hubs 13.

Preferably, each row 21 extends in the axial direction so that the set of rows in the axial direction has an axial extent size 1 equal to at least 60% of the overall axial extent L of the tubular body 1.

In the embodiment shown in the figures, each row 21 extends in the axial direction so that the set of rows in the axial direction have an axial extent size 1 equal to about 90% of the overall axial extent L of the tubular body 1.

Each through hole 4 has a diameter between 0.2 to 10 mm. Preferably, each through hole 4 has a diameter between 0.5 mm and 3 mm.

In the embodiment shown in the figures, the through holes 4 have at least one portion diverging away from the inner cavity 2.

Preferably, the diverging portion can be radial and radiused to the remaining portion of the through hole 4.

At least one filtering element 5 is arranged inside the tubular body 1, at least at one portion of the plurality of through holes 4, so that to filter the air passing between the inner cavity 2 and the plurality of holes 4.

Preferably, the aforesaid at least one filtering element 5 is arranged at the surface of the holes 4 facing the inside of the inner cavity 2.

Even more preferably, the aforesaid filtering element is facing inside the inner cavity 2.

The pressure of the air passing through the filtering element is reduced and redistributed more homogeneously when entering the through holes 4.

Preferably, the filtering element or filtering elements 5 is/are arranged to that to involve all through holes 4, in other words upstream of each through hole 4, i.e. inside the tubular body 1, at least one portion of filtering element 5 is arranged so that to filter/sift the air passing between the inner cavity 2 and the through hole 4 itself so that to reduce the air pressure upstream of the filtering element 5 and to distribute it more homogeneously.

Advantageously, the filtering element or the filtering elements 5 is/are arranged in contact with the inner surface of the holes 4, i.e. with the portion or end of the hole 4 facing the inner cavity 2.

The filtering element or the filtering elements 5 are arranged so that to abut with one of its/their outer side surfaces against the through holes 4, in other words, no other element or layer of material is inserted or interposed between the filtering element 5 and the through holes.

The filtering element 5 can have a thickness between 2 mm and 30 mm.

Preferably, the filtering element 5 is selected so that to have homogeneous porosity preferably between 10 microns and 100 microns.

Preferably, the filtering element 5 is selected so that to have pores with regular arrangements.

Preferably, the filtering element 5 is made of polyethylene.

Alternatively, the filtering element 5 is made of sintered plastic material or sintered metal material.

Alternatively, the filtering element 5 is made of a foam material, such as for example EPDM foam, silicone foam or polyurethane foam.

According to a first embodiment not shown in the figures, the filtering element 5 has a tubular shape of sizes such as to be inserted into the inner cavity 2 and to abut with its outer side surface against the through holes 4.

According to a further embodiment not shown in the figures, the filtering element 5 has a band-like shape spirally wound to form a tubular element, whose outer side surface abuts against the through holes 4.

In both embodiments mentioned above, the filtering element is fixed to the inner side surface of the cylindrical body 1 through glues, silicone sealants or mechanical fastening systems.

According to a further embodiment instead shown in FIGS. 1-4, the filtering element 5 is like a plurality of bands, each inserted in a filtering assembly 10.

In this case, the tubular body 1 has at least one housing seat 7 of at least one filtering assembly 10. In particular, four housing seats 7, each shaped to accommodate a filtering assembly 10, are shown in FIGS. 1 and 2.

The housing seats 7, as the filtering assemblies 10, could be more or less depending on the type of application without departing from the protection scope of the present invention.

Each filtering assembly 10 can be reversibly combined with a housing seat 7 by means of appropriate fastening means.

In the embodiment shown in FIGS. 1-4, a plurality of elastic V-shaped lugs 17' arranged so that to abut under the side surface of the tubular body 1 when the filtering assembly 10, described in more detail hereunder, is inserted in its housing seat, are provided as fastening means 17.

Six elastic lugs 17', arranged along the perimeter of the filtering assembly 10 and arranged in two groups of three, each on two opposite sides of the filtering assembly 10, are provided in the embodiment shown in the figures.

Different fastening means can be provided for reversibly and removably combining each filtering assembly 10 with its housing seat 7 without departing from the protection scope of the present invention.

In the embodiment shown in FIGS. 1-4, each filtering assembly 10 comprises an upper element 20 comprising through holes 4, at least one filtering element 5 and at least one pusher element 19 configured to push the filtering element 5 against the through holes 4.

Figure 3:
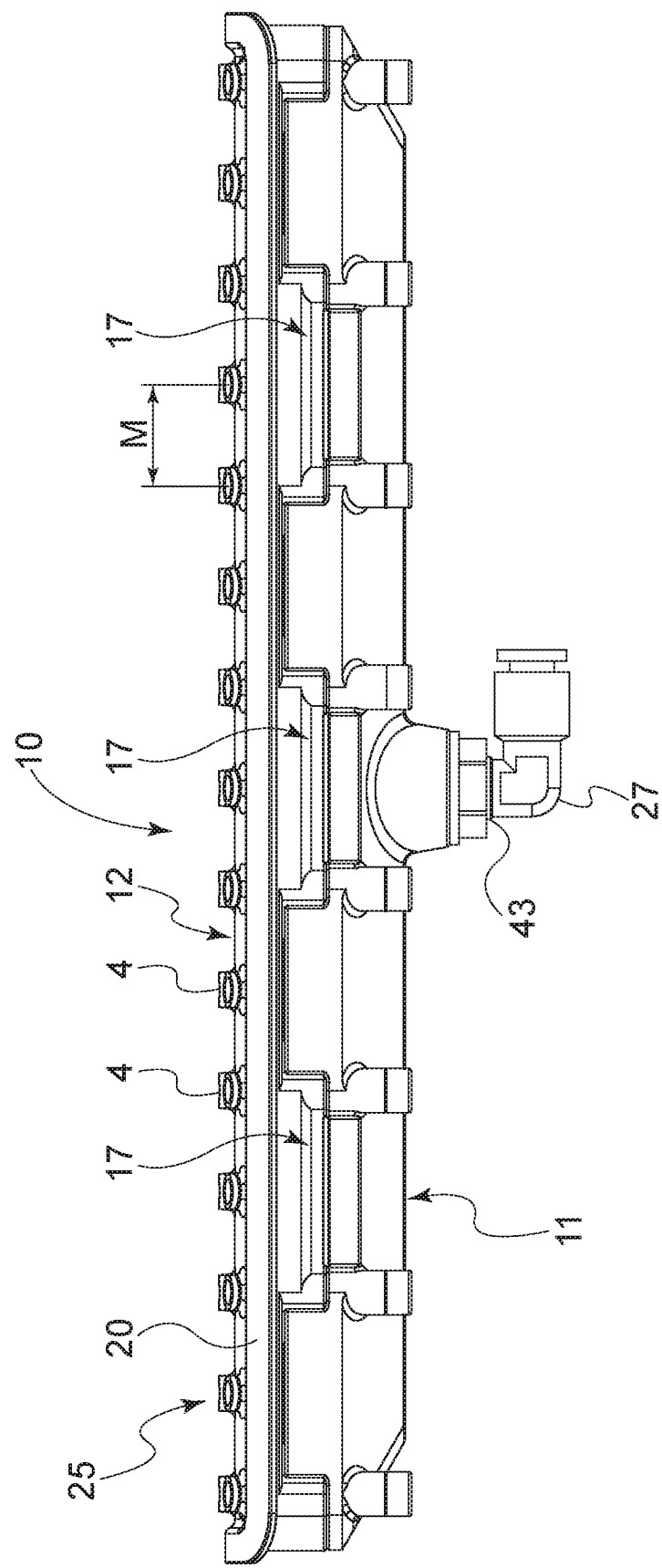
FIG. 3 shows a schematic enlarged view of a filtering assembly according to the present invention.
Figure 4:
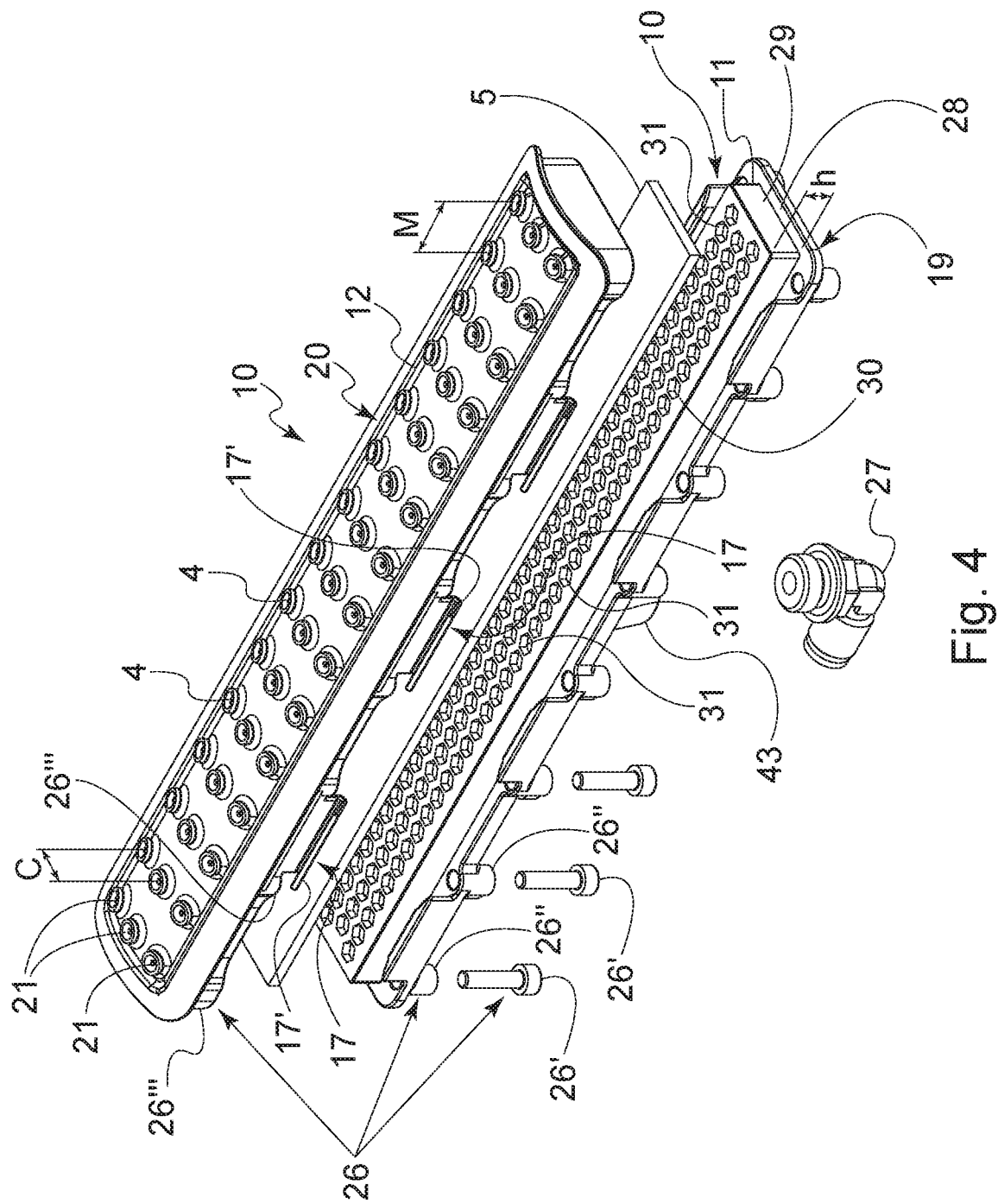
FIG. 4 shows a schematic enlarged exploded view of the filtering assembly of FIG. 3.

The upper element 20 and the pusher element 19 are configured so that to couple to one another to form a box-shaped body 25 shown in its closed configuration in FIG. 3, which contains the filtering element 5. When the upper element 20 and the pusher element 19 are coupled to form the box-shaped element 25, they achieve an inner cavity that houses the filtering element 5. When the upper element 20 and the pusher element 19 are coupled, they achieve a hermetically closed box-shaped element 25 that does not let air flow out, except through the appropriate through holes 4 and the opening 43 arranged on the bottom of the pusher element 19.

The pusher element 19 and the upper element 20 comprise second reversible fastening means 26 for their coupling.

In the embodiment shown in the figures, threaded screws 26' adapted to be engaged in appropriate internal-threaded seats 26" and 26"', respectively combined with the pusher element 19 and the upper element 20, are provided as reversible fastening means 26.

The upper element 20 has through holes 4, in particular in the embodiment shown in the figures each upper element 20 has three rows 21 of through holes, each extending in the axial direction. The through holes 4 are connected with the inner cavity of the box-shaped body 25 formed by the coupling of the upper element 20 and the pusher element 19.

The inner cavity of the box-shaped body 25 is in turn fluidically connected, through the opening 43 arranged on the bottom of the pusher element 19 and through an appropriate elbow-like joint 27 with the connection 6, to a compressed air source or a suctioning device.

For this purpose, each elbow-like joint 27 is connected to the connection 6 by means of a duct 14 running inside the tubular body 1.

The pusher element 19 forms the base of the box-shaped element 25 and is in turn formed by a bottom 28 and by a countering element 29 extending along the entire axial extent of the pusher element 19. The countering element 29 has a height h such as to force the filtering element 5 to abut against the through holes 4, when the upper element 20 and the pusher element 19 are coupled to form the box-shaped element 25.

In order to allow the passage of air flowing through the opening 43 to the filtering element 5, the countering element 29 has a grid 30 formed of a plurality of hexagonal holes 31. The grid 30 could be formed by openings or holes of different shape and sizes without departing from the present invention.

In the embodiment shown in the figures, the filtering element 5 is, in each filtering assembly 10, like a rectangular band with the same inner axial size as that of the upper element 20, so that all the through holes 4 are in contact with the filtering element 5 when the upper element 20 and the pusher element 19 are coupled to form the box-shaped element 25.

The connection 6 to a compressed air source or a suctioning device is provided at a supporting hub 13. All ducts 14 connecting each filtering assembly 10 to the external compressed air source, or still an external suctioning device, reach the connection 6.

In detail, with reference to the embodiment shown in the figures, the connection 6 consists of a central duct containing a central joint 32: the central duct, downstream of the central joint 32, branches off in several secondary channels, as many as the number of filtering assemblies 10 to be supplied or from which to make the air arrive. The secondary channels, which preferably depart radially from the central duct, have micro-regulators 33, preferably of cartridge-type. The micro-regulators 33 allow to regulate the flow rate of air inside the secondary channels and consequently to the filtering assemblies 10.

Moreover, the micro-regulators 33 are shaped to fully open or close the passage of air inside the secondary channels and consequently to the filtering assemblies 10.

The micro-regulators 33 are configured to be driven manually, but could alternatively be driven electrically by an external control unit or by one-way valves inside the tubular body 3 but operated from the outside, without departing from the present invention.

Downstream of the micro-regulators 33, each secondary channel has a quick coupling which fluidically connects each secondary channel with a duct 14.

The central channel and the secondary channels are made inside the supporting hub 13.

Several changes can be made to the embodiments described in detail, anyhow remaining within the invention, defined by the following claims.

What is claimed is:

1. A handling bar for supporting laminated or film supports, comprising:
    a hollow tubular body provided with an inner cavity and an outer side surface;
    a plurality of through holes extending substantially radially outward through the outer side surface of the tubular body to provide fluidic communication between the inner cavity and the outer side surface;
    at least one connection to a compressed air source or a suction device; the at least one connection being shaped for the inflow of compressed air into or to suction air from, the inner cavity; and
    at least one filtering element arranged inside the tubular body at least at one portion of the plurality of through holes to filter the air passing between the inner cavity and the plurality of through holes, the filtering element abutting the portion of the through hole facing the inner cavity.

2. The handling bar according to claim 1, wherein the filtering element is arranged at the entire plurality of through holes.

3. The handling bar according to claim 1, wherein the filtering element has a tubular shape.

4. The handling bar according to claim 1, wherein the filtering element has a band-like shape and the film comprises a laminated film, paper, leather, textile, plastic or metal materials.

5. The handling bar according to claim 1, wherein the tubular body comprises at least one housing seat of at least one filtering assembly.

6. The handling bar according to claim 5, wherein the at least one filtering assembly can be removably fixed in the at least one seat.

7. The handling bar according to claim 5, wherein the filtering assembly further comprises:
    at least one upper element comprising through holes;

the at least one filtering element; and at least one pusher element configured to push the at least one filtering element against the through holes.

8. The handling bar according to claim 7, wherein the pushing element comprises an opening for the inflow of compressed air into the filtering assembly or for suctioning air from inside the filtering assembly.

9. The handling bar according to claim 7, comprising a duct at least partially arranged inside the inner cavity for fluidically connecting each said filtering assembly with a connection to a compressed air source or a suction device.

10. The handling bar according to claim 7, further comprising two supporting hubs, each arranged at the opposite axial ends of the tubular body; wherein the at least one connection is arranged at one of the two supporting hubs.

11. The handling bar according to claim 7, wherein the filtering element has porosity between 10 microns and 100 microns.

12. The handling bar supports according to claim 7, wherein the pushing element comprises an opening for the inflow of compressed air into the filtering assembly or for suctioning air from inside the filtering assembly.

13. The handling bar according to claim 7, further comprising a duct at least partially arranged inside the inner cavity for fluidically connecting each said filtering assembly with a connection to the compressed air source or a suction device.

14. A handling bar for supporting laminated or film supports, comprising:
a hollow tubular body provided with an inner cavity and an outer side surface;
a plurality of through holes substantially radially outward, arranged on the tubular body to put the inner cavity in fluidic communication with the outer side surface;
at least one connection to a suction device, the connection shaped for suctioning air from the inner cavity;
at least one filtering element arranged inside the tubular body, at least at one portion of the plurality of through holes configured to filter the air passing between the inner cavity and the plurality of through holes.

15. The handling bar according to claim 14, further comprising a filtering assembly comprising:
at least one upper element comprising through holes;
the at least one filtering element; and
at least one pusher element configured to push the at least one filtering element against the through holes.

16. The handling bar supports according to claim 14, wherein the filtering element has a tubular shape.

17. A handling bar for supporting a film, comprising:
a hollow tubular body provided with an inner cavity and an outer side surface;
a plurality of through holes extending through the outer side surface of the tubular body to provide fluidic communication between the inner cavity and the outer side surface;
at least one connection to a compressed air source or a suction device, the connection shaped for the inflow of compressed air or to suction air into the inner cavity;
at least one filtering element arranged inside the tubular body for at least at one portion of the plurality of through holes; and
a filtering assembly including an upper element with through holes and at least one pusher element configured to push the at least one filtering element against the through holes.

18. The handling bar of claim 17, wherein the filtering element filters the air passing between the inner cavity and the plurality of holes, and the filtering element being arranged so to abut against the portion of the through hole facing the inner cavity.

19. The handling bar according to claim 17, wherein the filtering element is arranged at the entire plurality of through holes.

20. The handling bar according to claim 17, wherein the filtering element has a tubular shape.

* * * * *